(12) United States Patent
Levecq et al.

(10) Patent No.: US 8,593,623 B2
(45) Date of Patent: Nov. 26, 2013

(54) INSTRUMENT AND METHOD FOR CHARACTERISING AN OPTICAL SYSTEM

(75) Inventors: Xavier Levecq, Gif sur Yvette (FR); Guillaume Dovillaire, Palaiseau (FR)

(73) Assignee: Imagine Optic, Orsay (FR)

( * ) Notice: Subject to any disclaimer, the term of this patent is extended or adjusted under 35 U.S.C. 154(b) by 653 days.

(21) Appl. No.: 12/863,058

(22) PCT Filed: Jan. 16, 2009

(86) PCT No.: PCT/FR2009/050064
§ 371 (c)(1),
(2), (4) Date: Sep. 1, 2010

(87) PCT Pub. No.: WO2009/092975
PCT Pub. Date: Jul. 30, 2009

(65) Prior Publication Data
US 2011/0134417 A1 Jun. 9, 2011

(30) Foreign Application Priority Data
Jan. 18, 2008 (FR) ...................................... 08 50336

(51) Int. Cl.
*G01B 9/00* (2006.01)
(52) U.S. Cl.
USPC ...................................................... 356/125
(58) Field of Classification Search
None
See application file for complete search history.

(56) References Cited

U.S. PATENT DOCUMENTS

| | | | |
|---|---|---|---|
| 3,892,494 A | 7/1975 | Baker et al. | |
| 5,847,822 A * | 12/1998 | Sugiura et al. | ............. 356/239.2 |
| 6,266,141 B1 | 7/2001 | Morita | |
| 6,476,909 B1 * | 11/2002 | Nakayama et al. | ........ 356/239.2 |
| 6,687,396 B1 * | 2/2004 | Sugiura et al. | ................ 382/141 |
| 2001/0035948 A1 | 11/2001 | Maeda et al. | |
| 2004/0041978 A1 | 3/2004 | Neal et al. | |
| 2004/0174535 A1 | 9/2004 | Kuramoto | |
| 2005/0105044 A1 | 5/2005 | Warden et al. | |

FOREIGN PATENT DOCUMENTS

| | | |
|---|---|---|
| DE | 10333426 A1 | 2/2005 |
| EP | 0 831 298 A | 3/1998 |
| FR | 2 193 975 A | 2/1974 |
| WO | 01/89372 A | 11/2001 |
| WO | 03/022140 A | 3/2003 |
| WO | 2005017482 A1 | 2/2005 |

OTHER PUBLICATIONS

European Search Report in Corresponding Application No. FR 0850336 dated Sep. 4, 2008.

* cited by examiner

*Primary Examiner* — Gregory J Toatley
*Assistant Examiner* — Juan D Valentin, II
(74) *Attorney, Agent, or Firm* — Young & Thompson

(57) ABSTRACT

An instrument (1) for characterizing an optical system, includes: at least one primary source (3) for emitting an illumination light beam (FE); an optical device for directing the illumination beam (FE) onto the optical system (L) to be characterized; a wave front analyzer (4) adapted for receiving a beam from the optical system (L); and a unit for processing the measure signals from the wave front analyzer (4), adapted for providing characterization information of the optical system (L). The instrument further includes a scattering member (22) substantially provided in the focal plane of the optical system (L) so as to create a secondary source generating a secondary beam flowing through the optical system (L) and further directed towards the wave front analyzer.

33 Claims, 5 Drawing Sheets

INSTRUMENT AND METHOD FOR CHARACTERISING AN OPTICAL SYSTEM

BACKGROUND OF THE INVENTION

1. Field of the Invention

The present invention relates to an instrument for characterizing an optical system. It also relates to a characterization method implemented in this instrument.

2. Prior Art

There are already several instruments for characterizing an optical system. It is in fact possible to identify two families of instruments: systems based on measurement of the wave front (measurement of the aberrations) and other instruments that are not based on wave front measurement and do not allow the measurement of the optical aberrations of the system to be characterized.

Phase measurement systems include:

several phase measurement technologies: Fizeau interferometer, Hartmann or Shack Hartmann technology, lateral-shift interferometer technology;

phase measurement systems making it possible to characterize the aberrations of a system. On the basis of this measurement it is generally possible to determine, in addition to the aberrations, the point spread function (PSF) and the modulation transfer function (MTF) of the system to be characterized. With certain particular implementations, it is also possible to go back to the back focal distance and the numerical aperture of the system to be characterized.

On the other hand, these systems do not generally give the measurement of the focal length of the system to be characterized or the chromatic aberration value, and are all limited, owing to their implementation, by numerical aperture. Moreover, these systems measure only one field at a time and do not allow the measurement of the field curvature or the distortion of the objective.

Systems that are not based on phase measurement include:

certain instruments dedicated to the measurement of the focal length of the objective. But these are not based on measurement of the wave front;

other instruments dedicated to the measurement of the MTF of the objectives. In this family, certain instruments allow measurement of the objective at several angles of view, with the feature of taking account, in the measurement, of the effect of the field curvature of the objective. However, the capacity of these instruments is limited by their inability to measure the optical aberrations of the system to be characterized (these instruments are not based on wave front measurement);

other systems allowing measurement of the vignetting and the relative intensity as a function of the angle of view of an objective to be characterized but which do not provide the other data on the optical quality;

and instruments allowing the measurement of the distortion of an objective to be characterized but not providing the other data on the optical quality.

The purpose of the present invention is to overcome the drawbacks and limitations of the abovementioned characterization instruments, by proposing an optical metrology system based on a wave front measurement allowing the characterization of optical components having a positive (convergent) power without being limited by numerical aperture.

It thus relates to a novel concept for a characterization and metrology instrument which is not limited by numerical aperture and obtains an adequate set of data on the optical quality of the characterized system.

SUMMARY OF THE INVENTION

This purpose is achieved with an instrument for characterizing an optical system, comprising:

primary source means for emitting an illumination light beam, means for detachably receiving the optical system, means for directing this illumination beam onto the optical system to be characterized, wave front analysis means, arranged in order to receive a beam coming from the optical system, and means for processing the measurement signals coming from the wave front measurement means, and delivering characterization data of the optical system.

According to the invention, this instrument comprises moreover diffusion means arranged substantially in a focal plane of the optical system, so as to create a secondary source generating a secondary beam passing through the optical system and then directed onto the wave front analysis means.

The beam coming from this secondary source passes through the system to be characterized and the wave front is analyzed on leaving the optical system. The diffuser is mounted on a translation stage making it possible to position it approximately at the point at which the beam is focussed by the optical system to be characterized on the "outward" path.

The axis of translation is perpendicular to the diffuser which is parallel to the pupil of the optical system to be characterized and is in fact in the position where the matrix sensor (CCD or CMOS) associated with the optical system to be characterized would be.

The position of the diffuser in relation to the system to be characterized gives the back focal distance data of the system to be characterized. Moreover, the displacement of this diffuser by a known value on either side of the focal point, associated with the measurement of the change in the radius of curvature of the wave front by the wave front analyzer makes it possible to determine the focal distance of the system to be characterized.

The measurement plane of the wave front analyzer is conjugated with the pupil of the system to be characterized. This is necessary for the wave front metrology.

The use of several sources having different wavelengths makes it possible to measure the chromatic aberration of the system to be characterized.

It is preferable to move the diffuser and the illumination beam focussing on the latter in relation to each other in order to suppress the "speckle effect", particularly if the light sources are monochromatic.

This can be done, for example, by mounting the diffuser on a rotation stage, the axis of rotation of which is perpendicular to the latter. Other methods exist for carrying out this function: making the diffuser vibrate in its plane or moving the illumination beam on the diffuser using a prism mounted on a rotation stage, this system being placed preferably on a portion of the optical path that is common to the illumination and analysis beams.

A significant benefit of this architecture is its ability to carry out the measurement of aberration in the field of the objective to be characterized. In fact by mounting the diffuser assembly (on its translation stage Z) and the system to be characterized on a rotation stage (ROT Y), it is possible to obtain a measurement of the wave front in the field of the objective to be characterized. Unlike existing systems, this architecture also allows the measurement of the field curvature of the objective to be characterized.

In fact, if the objective exhibits field curvature, the focal plane that was situated in the diffuser plane at the centre of the field (FIG. 1), is offset from the plane of the diffuser when the objective is working in the field (FIG. 2). As the diffuser is no longer in the focal plane of the objective for the angle of view chosen in order to carry out the measurement, the wave front coming from the objective to be characterized is no longer collimated and the analyzer measures the defocussing value, making it possible to determine the field curvature of the objective.

It is possible to carry out a measurement of focal length in the field, following the same procedure as in the centre of the field: the change in the curvature of the wave front coming from the system to be characterized is measured by displacing the diffuser longitudinally. The measurement of the focal length in the field and its change with respect to the focal length at the centre of the field give the distortion value of the objective to be characterized.

Moreover, as the analyzer is conjugated with the pupil of the objective to be characterized, the latter measures the shape of the pupil for any point of the field measured, thus making it possible to directly determine the possible vignetting of the objective by comparison of the height and the shape of the pupil measured as a function of the angle of view.

On the other hand, by using illumination sources the light intensity of which is stable over time (at least during the period of a measurement cycle: several tens of seconds at most), the measurement of the flux incident on the analyzer as a function of the measured field makes it possible to determine a photometric property of the objective to be characterized, namely the variation of the illumination as a function of the angle of view ("relative illumination").

Moreover, in order to be able to analyze any point of the field of the objective (angle and azimuth), the sample can be placed in a mount mounted on a rotation stage the axis of which is perpendicular to the pupil of the objective to be characterized and passes through the centre of said pupil.

Clearly, from the measurement of the aberrations, it is simple to calculate the PSF (Point Spread Function) and also especially the MTF (modulation transfer function), for all the measured points of the field.

According to a further aspect of the invention, a method is proposed for characterizing an optical system, implemented in an instrument according to the invention, comprising:
   emission of an illumination light beam which is directed onto the optical system to be characterized, which was placed beforehand on a mount,
   wave front analysis carried out on an analysis beam coming from the optical system, and
   processing of measurement signals coming from the wave front analysis, so as to deliver characterization data of the optical system,
characterized in that the illumination beam passing through the optical system is focussed on a diffusion element in order to create a secondary source generating a secondary analysis beam passing through the optical system and then directed on the wave front analysis means.

A difficulty caused by this measurement architecture is the management of stray light and in particular the stray reflections linked to the optical elements common to the illumination beam (FE) and the analysis beam (FA). Several solutions can be envisaged in order to overcome this difficulty:
   separating the illumination and analysis pathways as far as possible. But there will always be at least the lens to be characterized and a beam splitter on the common beam,
   returning the illumination beam onto a pupil that is smaller than the pupil of the system to be characterized and off-axis. The fact of having a smaller pupil moreover makes it possible to have a greater depth of field on illumination (the source point formed on the diffuser remains small even when the diffuser is not perfectly in the focal plane of the objective),
   placing a filtering hole on the analysis optical path so as to block the stray reflections,
   adjusting the polarization of the beams. The polarization of the illumination beam is polarized on an axis and the polarization of the analysis beam is polarized on the axis rotated through 90° with respect to the polarization of the illumination beam (presence of polarizers on the illumination and analysis beams). The depolarisation of the illumination beam is ensured by the diffuser. If the diffuser does not depolarize the beam sufficiently, a ¼ wave plate can be placed on the common illumination-analysis path in order to rotate the polarization by 90°.

These solutions can of course be combined in order to limit the stray reflections.

DESCRIPTION OF THE FIGURES

Other advantages and features of the invention will become apparent on examination of the detailed description of an embodiment which is in no way limitative, and the attached drawings, in which.

DETAILED DESCRIPTION OF AN EMBODIMENT

Figure 1:
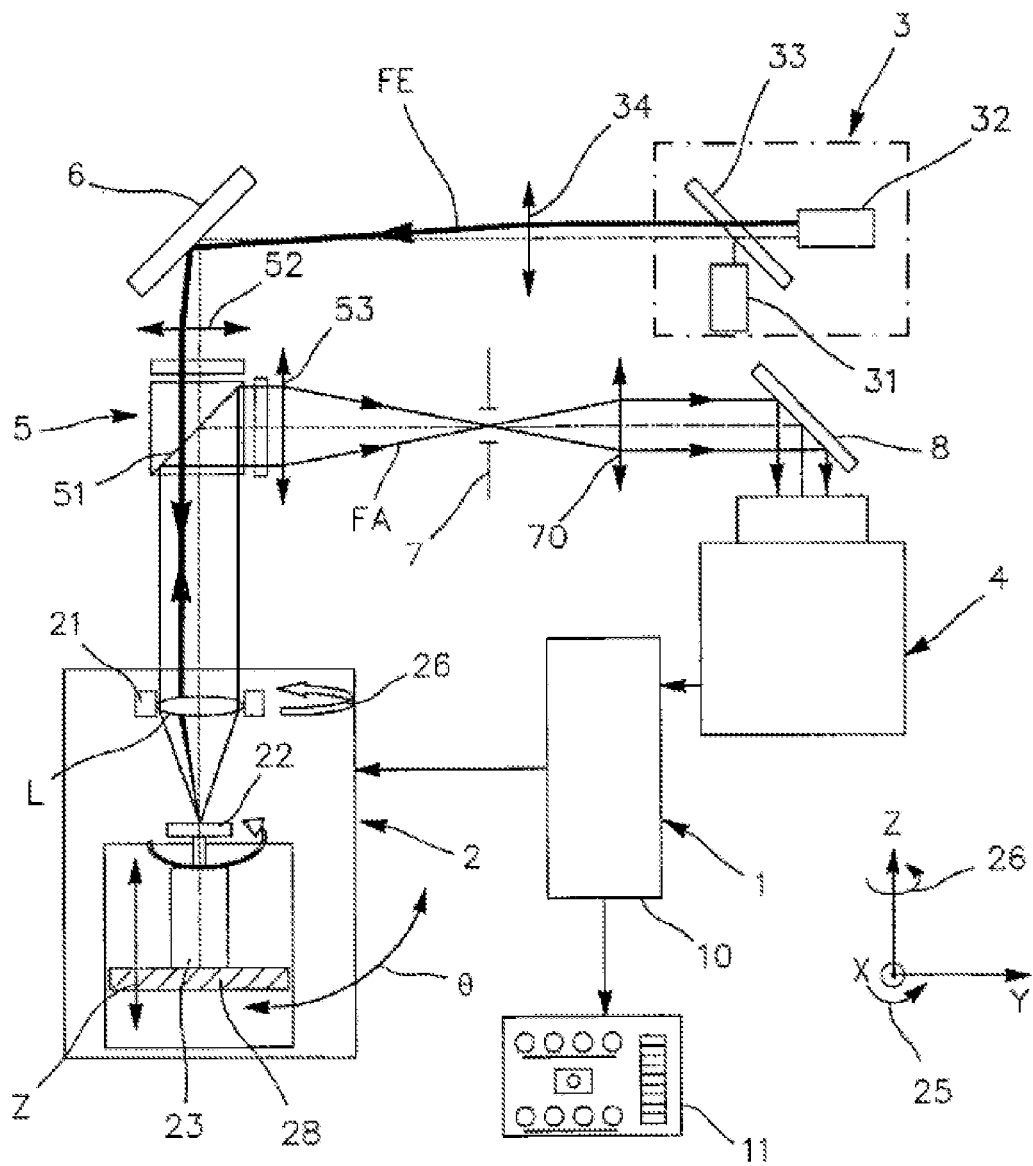
FIG. 1 is a block diagram of a characterization instrument according to the invention, shown with a zero pivot angle of the diffusion structure.
Figure 2:
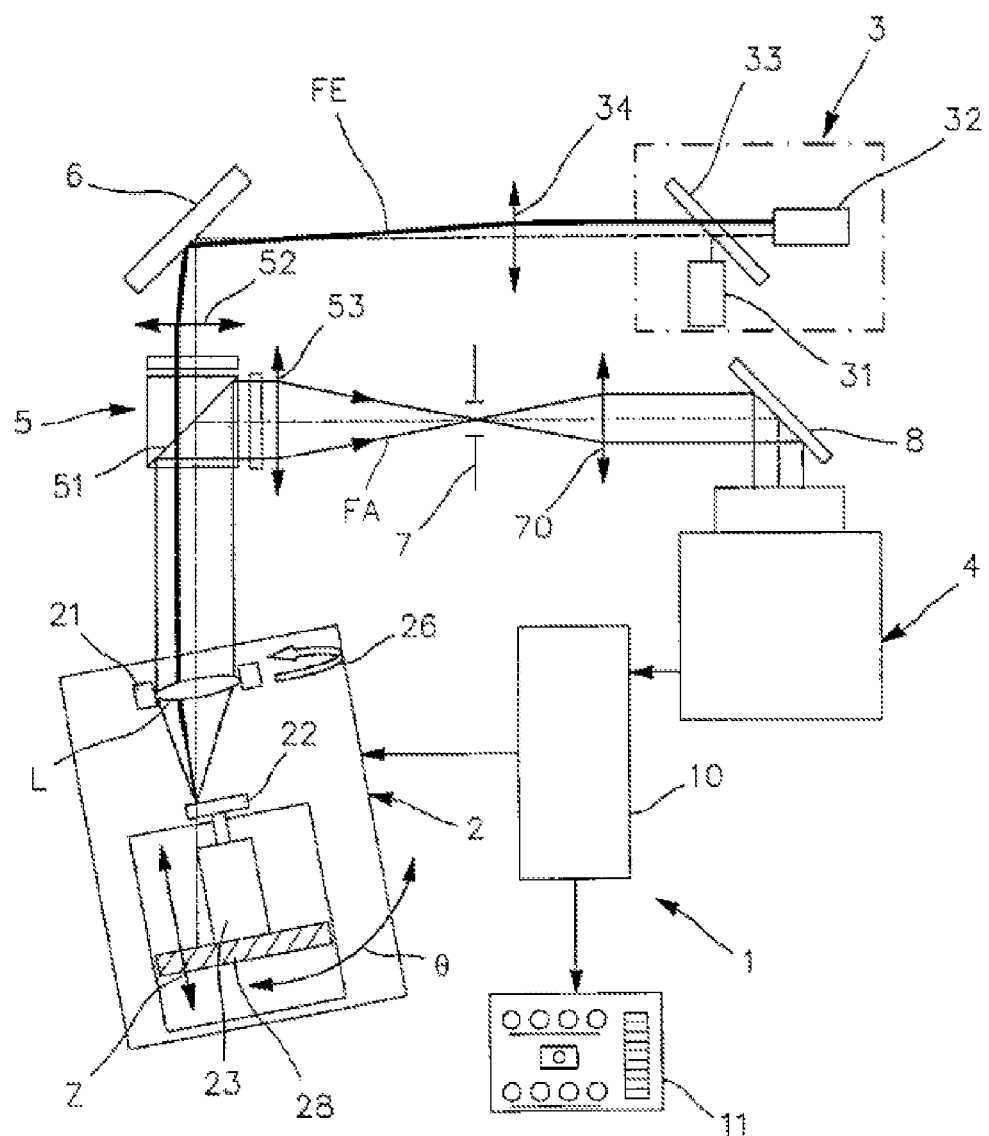
FIG. 2 corresponds to the block diagram in FIG. 1, with a non-zero determined pivot angle.

A characterization instrument 1 comprises, with reference to FIGS. 1 and 2, a system of illumination sources 3, a pivoting supporting structure 2 intended to receive on a mount 21 an optical system to be characterized, a beam separator module 5, a wave front analyzer module 4 and a processor module 10 provided in order to be connected to a terminal 11.

The illumination source system 3 includes a first source 31 at a first wavelength, a second source 32 at a second wavelength and a dichroic mirror 33. These two sources are produced for example in the form of laser diodes. The illumination beam FE produced is focussed by a lens 34 deflected by a mirror 6 through a lens 52 and the separator module 5 in order to reach an optical system L to be characterized, arranged in the mount 21 within the supporting structure 2.

This mount 21 receiving the optical system L can be firmly attached to the supporting structure 2 by magnetic coupling. A dedicated mechanism 29, for example an electrical actuator having an endless screw, allows the mount 21 to be rotated through an adjustable angle 26 about its axis of symmetry.

The optical system L to be characterized can be for example an optical objective intended for example to equip a photographic device, a camera or a mobile phone.

The pivoting supporting structure 2, which can have an adjustable angle of view θ controlled by an electromechanical device (not shown) comprises moreover a plane optical diffusion element 22, the rotation of which on itself is controlled by a motor 23 in order to suppress the speckle effect.

Figure 7:
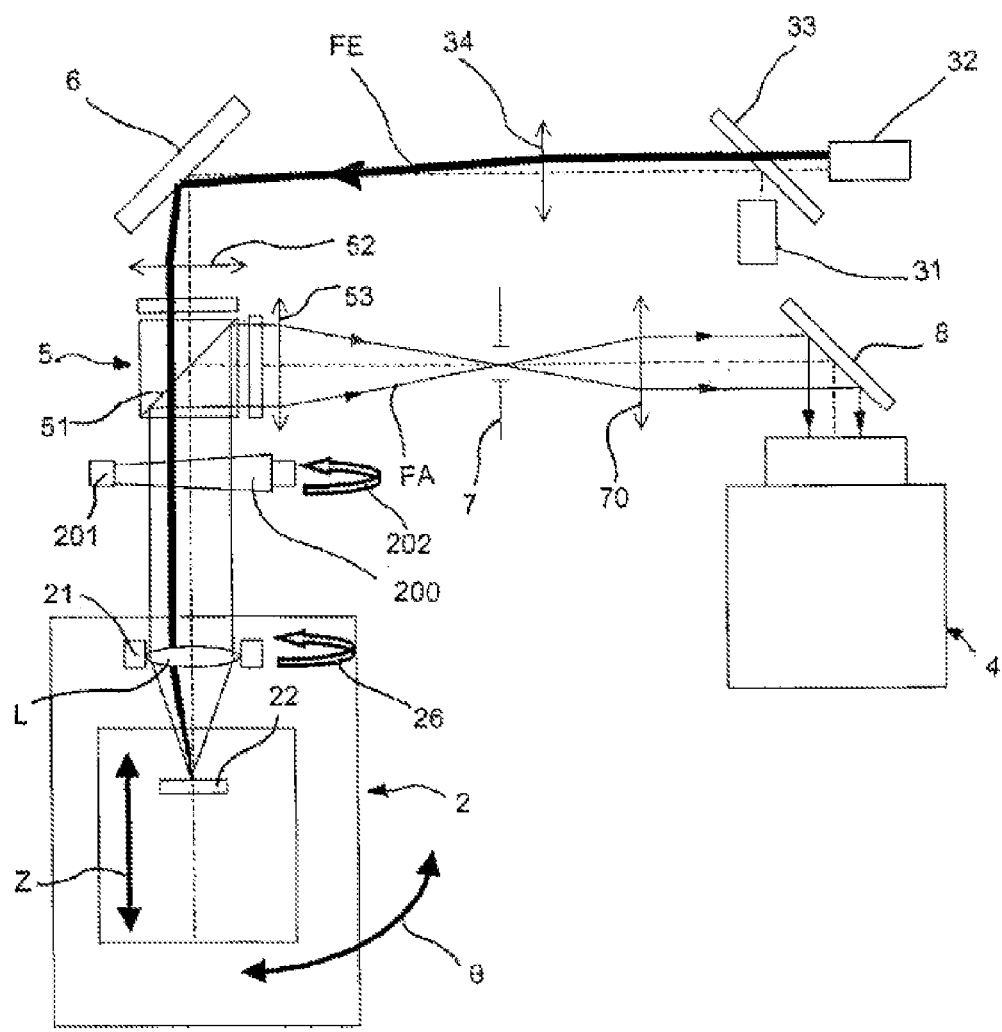
FIG. 7 shows a block diagram of a characterization instrument according to the invention, comprising a rotary prism.

According to a similar embodiment shown in FIG. 7, the speckle effect is suppressed owing to the action of a prism 200 mounted in a mount 201 rotating through an angle 202 about itself and about the Z axis. The prism 200 is preferably a right prism with a triangular base, the base being situated in the plane formed by the Z and Y axes. The prism 200 is arranged preferably on a portion of the optical path common to the illumination beam FE and the analysis beam FA. The rotation of the prism 200 is such that the illumination beam FE and the analysis beam FA pass through the prism 200 over their entire section, whatever the angle of rotation of said prism 200. The rotation of the prism 200 is preferably, but not necessarily, a regular rotation. When immobile, the prism 200 modifies the direction of the beams passing through it, without thereby altering their focal plane. The rotation of the prism 200 thus makes it possible to move the illumination beam FE on the diffuser element 22, in order to suppress the speckle effect. The angle of the prism is chosen sufficiently large in order to generate a significant displacement of the focussing spot on the diffuser and sufficiently small to avoid causing significant variations of the aberrations of the objective to be characterized with respect to the amplitude of the deflections produced.

The diffuser element 22 can also be positioned with precision along an axis of translation Z perpendicular to the plane (X,Y) of the mount 21, from a motorized platform 28, within the pivoting supporting structure 2.

The separator module 5 is arranged in the path of the illumination beam FE and the analysis beam FA between the deflecting mirror 6 and the optical system L to be characterized.

It includes a separating surface 51. A lens 53 focuses the analysis beam FA on a spatial filtering hole 7 downstream of which a lens 70 is placed. The lenses 51 and 70 have a dual role: the conjugation of the pupil of the system to be characterized with the measurement pupil of the analyzer and the production of the optical magnification between the pupil of the system to be characterized and the pupil of the analyzer.

In order to carry out this dual function, a third lens (not shown) may prove to be necessary. Moreover, in a preferred embodiment, the optical system of enlargement and conjugation of the pupil is an afocal system without optical power. The analysis beam FA coming from the optical system 70 is deflected by a mirror 8 onto the entrance of the wave front analyzer module 4. This analysis module 4 includes for example an array of CCD sensors (charge-coupled devices) and delivers analysis signals to a processor module 10 programmed in order to deliver data on the optical quality of the system to be characterized to a terminal 11.

Figure 4:
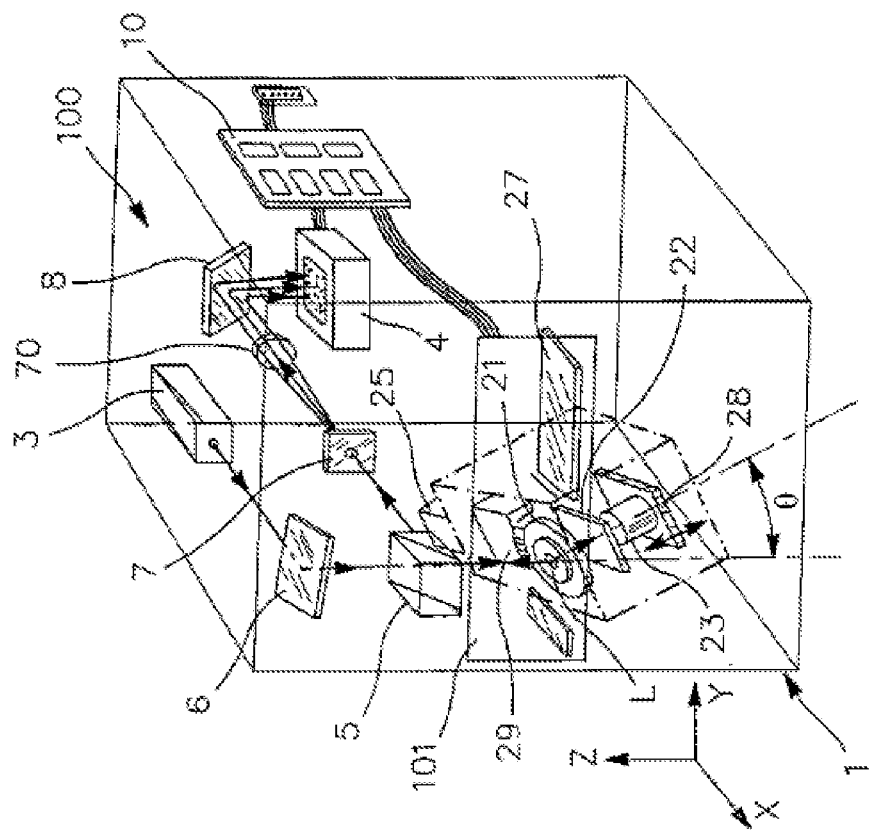
FIGS. 3 and 4 are diagrammatic perspective views of the characterization instrument shown in FIGS. 1 and 2.
Figure 3:
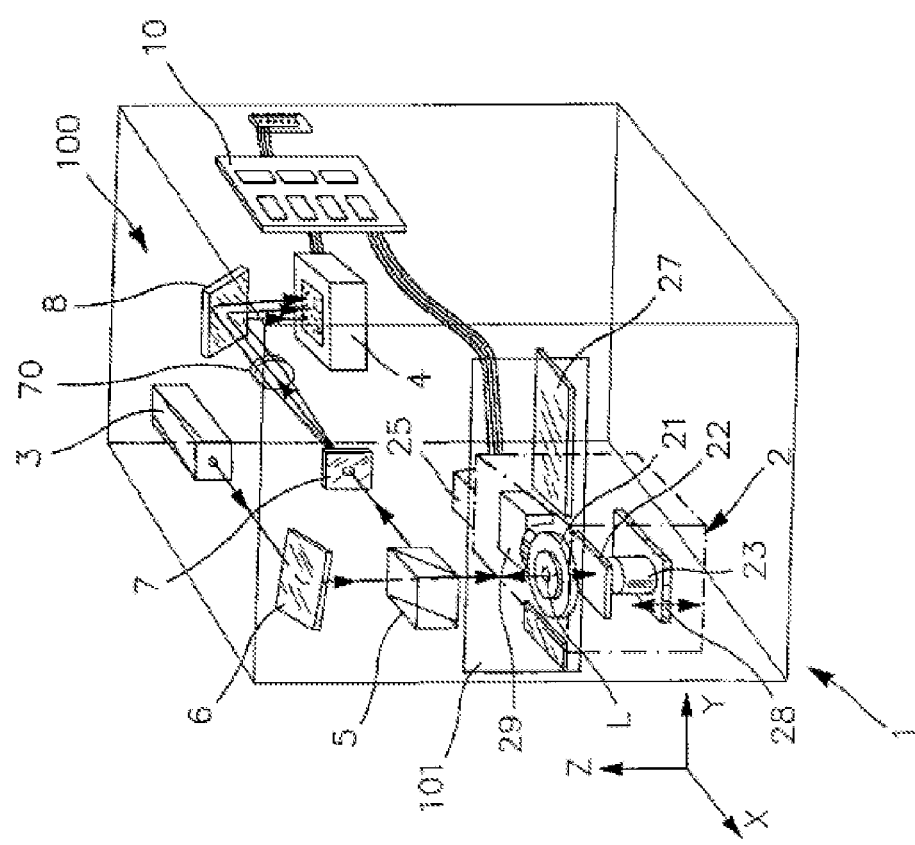

With reference to FIGS. 3 and 4, the characterization instrument 1 according to the invention can be designed within a compact housing 100 capable of being placed on a table or workstation. This housing 100 can be provided on its front face with an opening 101 allowing easy operator access, on the pivoting structure 2, to a base receiving the mount 21 on which the optical system L to be characterized is arranged. The operator can also make use, through the opening, of a support 27 capable of receiving another mount before its installation on the pivoting structure 2.

A description will now be given, with reference to the above-mentioned figures and to FIGS. 5 and 6, of a practical example 1 of implementation of the characterization instrument 1 according to the invention.

The characterization instrument 1 is connected to a data-processing workstation (not shown) on which application software implementing the corresponding characterization method has been installed. This software provides graphical interfaces I1, I2 providing the operator, on the one hand, with functionalities for setting the parameters of the characterization instrument and on the other hand, control panels bringing together quantitative data on the quality of the optical system to be characterized.

Firstly, the operator inserts an optical objective for characterization into the mount 21 outside the characterization instrument 1. Through the aperture 101, he then arranges the mount 21 on a magnetic support of the pivoting receiving structure 2.

From the graphical interface 11, he then issues a request for a characterization. The processor module 10 then actuates the different positioning and rotation devices in the characterization instrument, in order to produce a series of quantitative data as a function of the angle of view and the angle of orientation of the objective.

The characterization method according to the invention allows a complete characterization of a positive power optical system:
 measurement of back focal distance,
 measurement of focal length,
 measurement of chromatism (if there are several light sources),
 measurement of aberrations,
 measurement of the field curvature,
 measurement of the distortion,
 measurement of the vignetting and the variation of illumination as a function of the field,
 calculation of the point spread function PSF for all the measured points of the field,
 calculation of the modulation transfer function MTF for all the measured points of the field (and for the different wavelengths, and if necessary taking into account the chromatic aberration in the calculation of the MTF).

It should be noted that if it is desired to characterize a negative optical power system, it is only necessary to then add a known optical device having a sufficiently positive power so that the assembly constituted by the system to be characterized and by this known device has a positive optical power. This optical device having a positive power must be placed close to the optical system to be characterized, in the optical path of the illumination and analysis beams.

Figure 5:
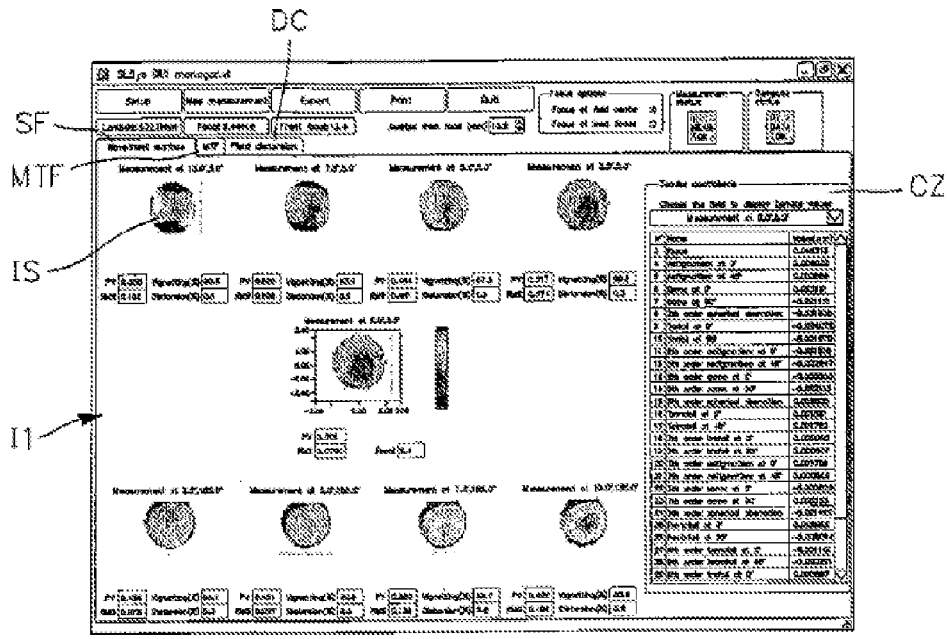
FIG. 5 shows a first graphical interface generated by implementation of the characterization method according to the invention, displaying quantitative data on the wave front surfaces of an optical objective to be characterized.
Figure 6:
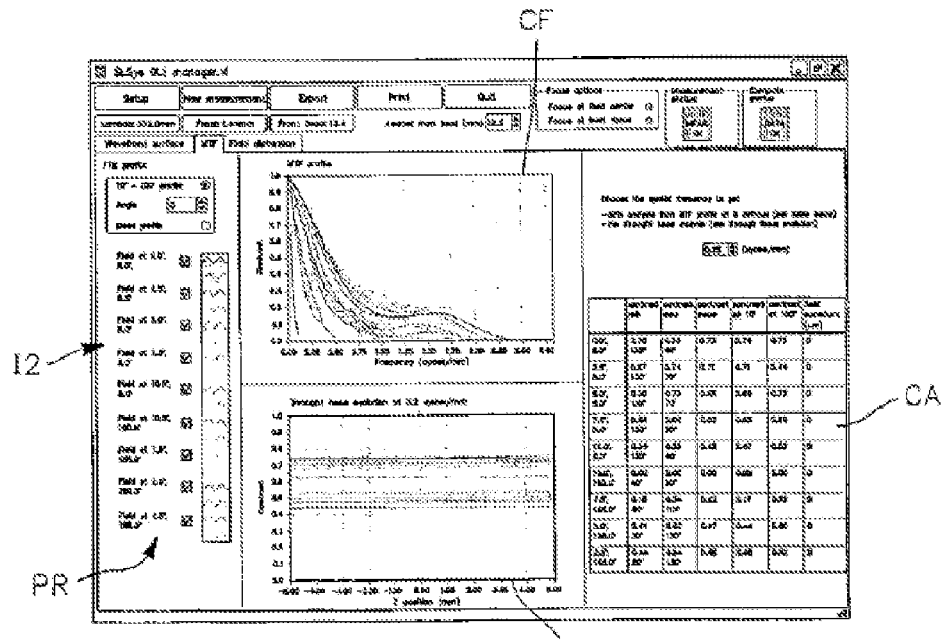
FIG. 6 shows a second graphical interface generated by implementation of the characterization method according to the invention, displaying quantitative data on the modulation transfer function of an objective to be characterized.

With reference to FIGS. 5 and 6, on completion of the measurement sequence carried out automatically by the characterization instrument 1, the operator can in particular be provided with three characteristic data groups:
 wave front surface data SF, in the form of graphical representations of surfaces IS for a set of angles of measurement, comprising distortion and vignetting values, as well as a set CZ of Zernike coefficients (FIG. 5);
 modulation transfer function (MTF) data comprising profiles (PR) for different angles of measurement, curves CF of the change in contrast as a function of frequency, curves CP of the change in contrast as a function of the focussing position, and a summary table CA of the measurements of contrast and field curvatures as a function of the angles of measurement.

Of course, the invention is not limited to the examples which have just been described, and numerous adjustments can be made to these examples without exceeding the scope of the invention.

In particular, the number of light sources having different wavelengths used in order to produce the illumination beam is not limited to two and can be determined according to the characterization requirements.

The invention claimed is:

1. An instrument for characterizing an optical system, the instrument comprising:
    primary source means for emitting an illumination light beam;
    means for detachably receiving said optical system;
    means for directing the illumination beam onto said optical system to be characterized;
    wave front analysis means, arranged in order to receive a secondary beam coming from said optical system;
    means for processing measurement signals coming from the wave front analysis means, and delivering characterization data of the optical system; and
    diffusion means arranged substantially in a focal plane of said optical system, so as to create a secondary source generating the secondary beam called an analysis beam passing through said optical system and then directed onto said wave front analysis means.

2. The instrument according to claim 1, further comprising means for positioning the diffusion means substantially at the point at which the beam is focused by the optical system to be characterized on the outward path.

3. The instrument according to claim 2, wherein the positioning means are arranged in order to displace the diffusion means in a direction substantially perpendicular to the plane of the optical system to be characterized.

4. The instrument according to claim 3, further comprising means for controlling the displacement of said diffusion means with respect to the optical system to be characterized, wherein the processing means are arranged in order to process measurement of the displacement and the signals coming from the wave front analysis means, so as to provide data on the focal distance of the optical system to be measured.

5. The instrument according to claim 1, further comprising means for optically conjugating the measurement plane of the wave front analysis means with the pupil of the optical system to be characterized.

6. The instrument according to claim 5, wherein the optical conjugation means have no optical power.

7. The instrument according to claim 1, further comprising optical means for separating the illumination beam from the analysis beam coming from the optical system to be characterized and for directing said analysis beam towards the wave front analysis means.

8. The instrument according to claim 1, wherein the primary source means comprise a first light source at a first wavelength and a second light source at a second wavelength, and the processing means are arranged in order to provide a measurement of the chromatic aberration of the optical system to be characterized.

9. The instrument according to claim 1, further comprising mounting means arranged in order to detachably receive the optical system to be characterized, the mounting means defining a mounting plane substantially parallel to the plane of the diffusion means.

10. The instrument according to claim 9, further comprising means for rotating the mounting means through a predetermined angle with respect to the axis of revolution of the mounting means.

11. The instrument according to claim 9, wherein the mounting means and the diffusion means are included in a structure capable of pivoting through a predetermined angle about a pivot axis substantially perpendicular to the direction of the illumination beam on the optical system to be characterized.

12. The instrument according to claim 9, further comprising means for vibrating the diffusion means in the plane of the diffusion means substantially parallel with the plane of the mounting means.

13. The instrument according to claim 1, further comprising means for rotating the diffusion means about an axis of rotation passing substantially through the focal point of the illumination beam on said diffusion means.

14. The instrument according to claim 1, further comprising means for displacing the focusing point of the illumination beam having passed through the optical system, on the diffusion means.

15. The instrument according to claim 14, wherein the beam displacement means comprise a prism mounted in a mount in rotation through an angle about itself and about the Z axis and arranged on a portion of the optical path common to the illumination beam and analysis beam.

16. The instrument according to claim 1, further comprising means for limiting the stray reflections caused by the common illumination-analysis path between the illumination beam and the analysis beam.

17. The instrument according to claim 16, further comprising, by way of means of limiting the stray reflections, spatial filtering means arranged between the separator means and the wave front analysis means.

18. The instrument according to claim 16, further comprising, by way of means of limiting the stray reflections, first means for polarizing the illumination beam, second means for polarizing the analysis beam along an axis offset by 90° with respect to the polarization of the illumination beam, the diffusion means ensuring the depolarization of said illumination beam.

19. The instrument according to claim 18, further comprising, by way of means of limiting stray reflection, a quarter-wave plate arranged on the common illumination-analysis path.

20. A method for characterizing an optical system, implemented in an instrument according to claim 1, the method comprising:
    emitting an illumination light beam which is directed onto said optical system to be characterized previously arranged on a mount;
    carrying out a wave front analysis on an analysis beam coming from said optical system;
    processing measurement signals coming from the wave front analysis, so as to deliver characterization data of the optical system,
    wherein the illumination beam passing through the optical system is focused on a diffusion element in order to create a secondary source generating a secondary analysis beam passing through said optical system and then undergoing a wave front analysis.

21. The method according to claim 20, further comprising positioning the diffusion element substantially at the point at which the beam is focused by the optical system to be characterized, on the outward path.

22. The method according to claim 21, further comprising controlling the displacement of the diffusion element with respect to the optical system to be characterized; and processing measurement of the displacement and of wave front analysis signals so as to provide focal distance data of said optical system.

23. The method according to claim 20, wherein the emission of an illumination beam comprises an emission at a first wavelength and an emission at a second wavelength, and
the processing is arranged in order to measure the chromatic aberration of the optical system to be characterized based on wave front analyses carried out at said first and second wavelengths.

24. The method according to claim 20, further comprising rotating, in a sequence on itself, of the optical system to be characterized.

25. The method according to claim 20, pivoting, in sequence, the optical system to be characterized and the diffuser element through a predetermined angle about a pivot axis substantially perpendicular to the direction of the illumination beam on said optical system.

26. The method according to claim 20, further comprising relative displacing, in a series, between the focal point of the illumination beam having passed through the optical system and the diffuser element.

27. The method according to claim 20, further comprising:
conducting a first sequence of measurements in which the measurements are carried out at the center of the field of the optical system to be characterized; and
conducting a second sequence of measurements in which the measurements are carried out in the field of said optical system to be characterized.

28. The method according to claim 27, wherein the angular offset for passing from the measurements at the center of the field to the measurements in the field of the optical system to be characterized is obtained by a pivoting said optical system to be characterized and the diffuser element through a predetermined angle of view along an axis substantially perpendicular to the incident direction of the illumination beam.

29. The method according to claim 28, further comprising determining the field curvature of the optical system to be characterized on the basis of the first and second sequences of measurements carried out at variable angles of view.

30. The method according to claim 27, further comprising measuring focal length in the field on the basis of the first and second sequences of measurements carried out at variable angles of view.

31. The method according to claim 30, further comprising measuring the change in the focal length in the field with respect to the focal length at the center of the field, so as to provide a measurement of the distortion of the optical system to be characterized.

32. The method according to claim 27, further comprising measuring the shape of the pupil of the optical system to be characterized, for any point of the field measured for variable angles of view, leading to a direct determination of a possible vignetting of said optical system.

33. The method according to claim 27, further comprising measuring the incident flux on a wave front analyzer as a function of the measured field, leading to a determination of the variation of illumination as a function of the angle of view.

* * * * *

UNITED STATES PATENT AND TRADEMARK OFFICE
CERTIFICATE OF CORRECTION

PATENT NO. : 8,593,623 B2  Page 1 of 1
APPLICATION NO. : 12/863058
DATED : November 26, 2013
INVENTOR(S) : Levecq et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this
Twenty-second Day of September, 2015

Michelle K. Lee
*Director of the United States Patent and Trademark Office*